(12) United States Patent
Sato et al.

(10) Patent No.: US 7,867,034 B1
(45) Date of Patent: Jan. 11, 2011

(54) CARD CONNECTOR

(75) Inventors: Shigeru Sato, Chiba (JP); Masato Koyasu, Sakura (JP); Yosuke Takai, Sakura (JP); Masaaki Oshima, Oshima (JP)

(73) Assignees: Yamaichi Electronics Co., Ltd., Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 12/801,080

(22) Filed: May 20, 2010

(30) Foreign Application Priority Data

Jul. 2, 2009 (JP) .............................. 2009-158094

(51) Int. Cl.
*H01R 24/00* (2006.01)

(52) U.S. Cl. ...................................... 439/630; 439/159

(58) Field of Classification Search ................. 439/325, 439/630, 631, 632, 159, 160
See application file for complete search history.

(56) References Cited

U.S. PATENT DOCUMENTS

| | | | | |
|---|---|---|---|---|
| 5,033,972 | A | * | 7/1991 | Komatsu et al. ............. 439/153 |
| 5,421,737 | A | * | 6/1995 | Chen et al. .................. 439/157 |
| 5,643,001 | A | * | 7/1997 | Kaufman et al. ............ 439/159 |
| 6,059,588 | A | * | 5/2000 | Tung et al. .................. 439/159 |
| 6,086,393 | A | * | 7/2000 | Tung et al. .................. 439/159 |
| 6,379,167 | B1 | * | 4/2002 | Zhang et al. ................ 439/157 |
| 6,402,529 | B2 | | 6/2002 | Saito et al. |
| 6,482,030 | B1 | * | 11/2002 | Kuo ........................ 439/541.5 |
| 6,508,402 | B1 | | 1/2003 | Takada et al. |
| 6,699,061 | B2 | | 3/2004 | Abe et al. |
| 6,913,492 | B2 | | 7/2005 | Kuroda et al. |
| 6,976,879 | B2 | | 12/2005 | Shishikura et al. |
| 7,438,598 | B1 | | 10/2008 | Ito et al. |

FOREIGN PATENT DOCUMENTS

| | | |
|---|---|---|
| JP | B2-3252133 | 1/2002 |
| JP | B2-3385249 | 3/2003 |
| JP | B2-3385252 | 3/2003 |
| JP | B2-3396457 | 4/2003 |
| JP | B2-3532849 | 5/2004 |
| JP | B2-3571980 | 9/2004 |
| JP | B2-3573642 | 10/2004 |
| JP | B2-3803098 | 8/2006 |
| JP | B2-3868918 | 1/2007 |
| JP | B2-3901568 | 4/2007 |
| JP | B2-3949060 | 7/2007 |
| JP | B2-3999652 | 10/2007 |
| JP | B2-4104369 | 6/2008 |
| JP | B2-4104370 | 6/2008 |
| JP | B2-4128411 | 7/2008 |

* cited by examiner

*Primary Examiner*—T C Patel
*Assistant Examiner*—Phuong Nguyen
(74) *Attorney, Agent, or Firm*—Oliff & Berridge, PLC

(57) ABSTRACT

A card insertion slot in the card connector through which two types of cards, large and small cards, can be selectively installed in a card accommodation space include first and second guideways in corresponding to the sizes of the cards. The card connector includes first and second contacts, a lock bracket configured to detect the width of the large card, an actuator configured to be rotatable, and a partition member including a partition plate configured to be movable. When the large card is inserted into the card connector, the lock bracket is moved from the first position to the second position. When the large card is further fed into the card connector, the actuator is rotated from the first position to the second position, and the partition plate is moved from the first position to the second position.

7 Claims, 14 Drawing Sheets

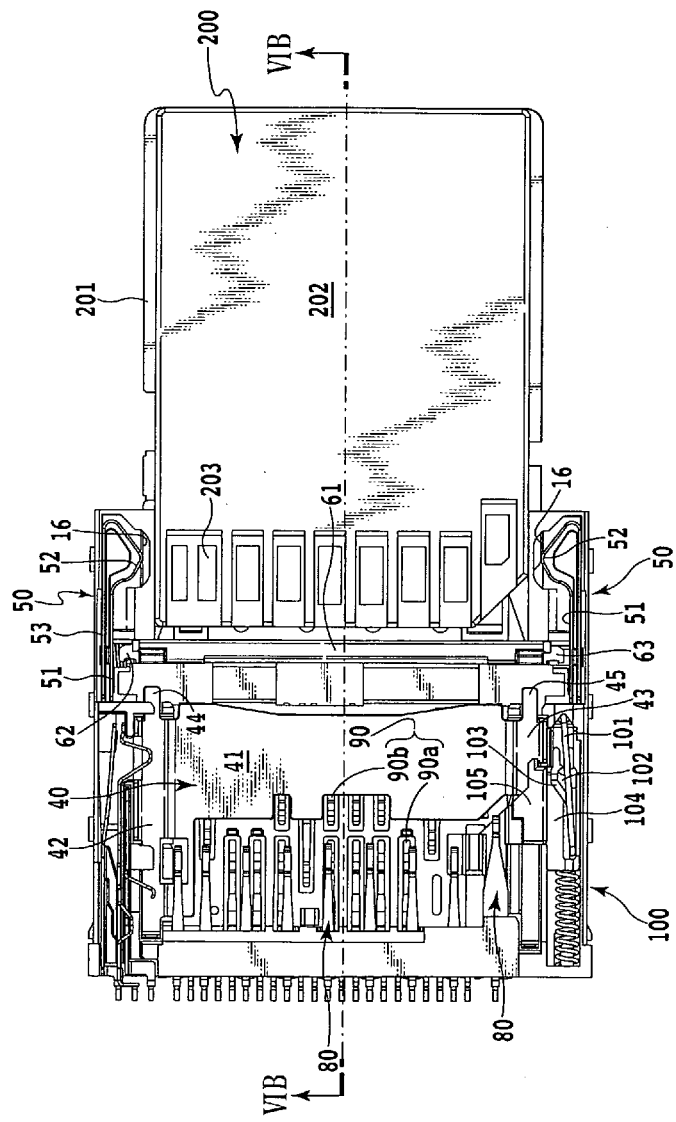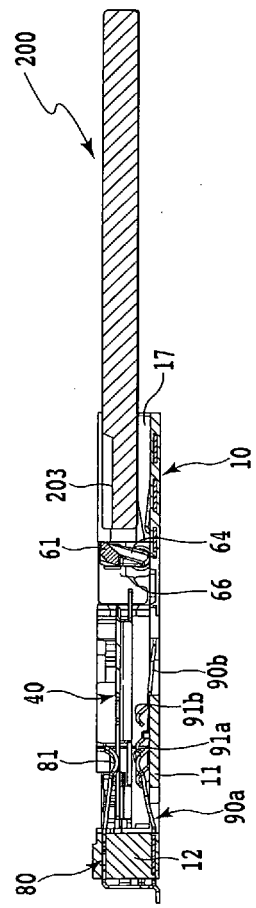
FIG.6A
FIG.6B

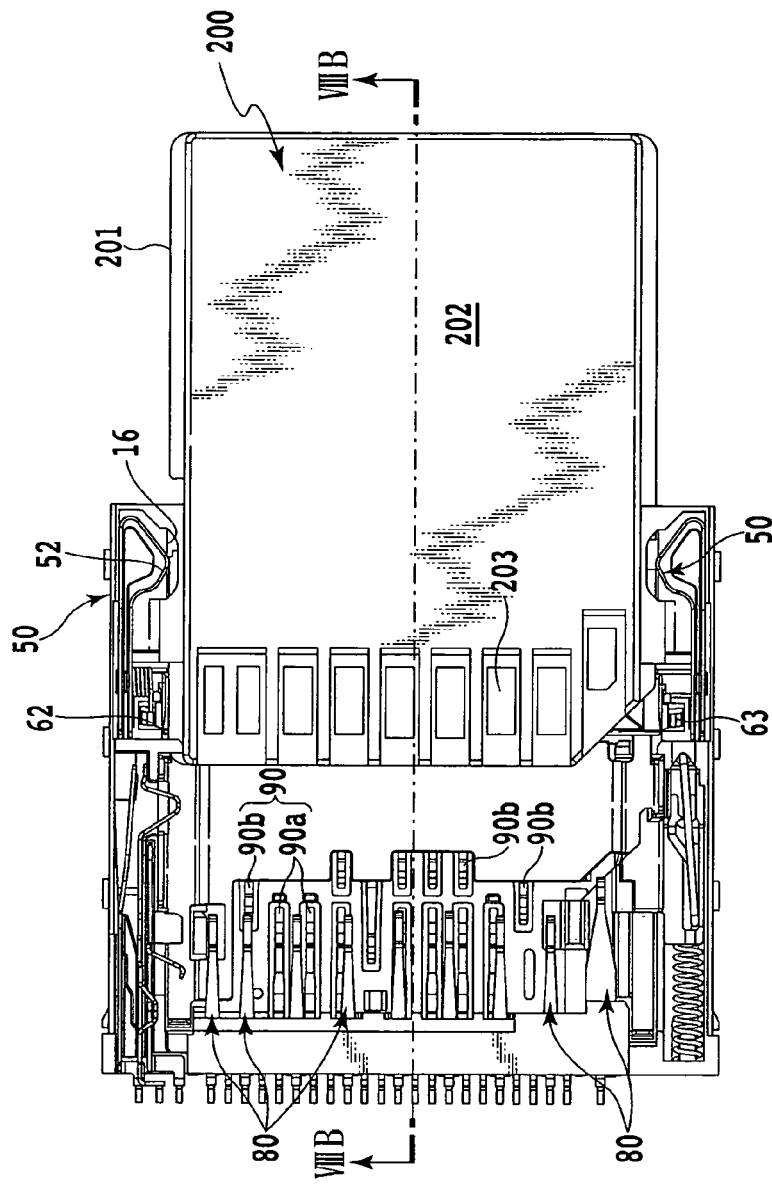
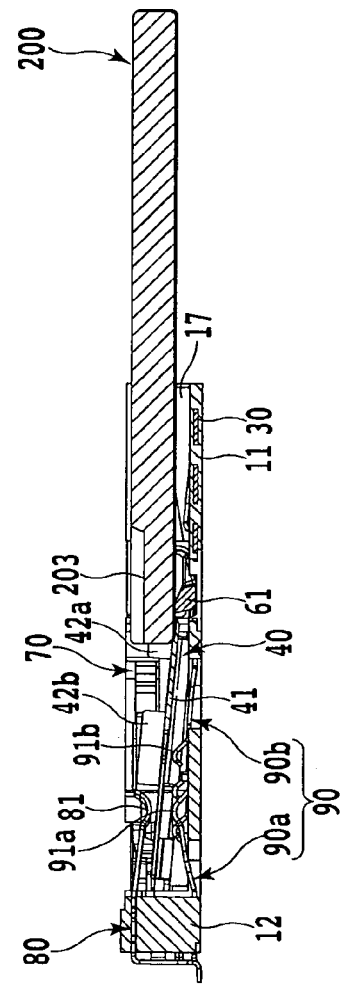
FIG.8A
FIG.8B

CARD CONNECTOR

CROSS-REFERENCE TO RELATED APPLICATIONS

This application claims the benefit of Japanese Patent Application No. 2009-158094, filed Jul. 2, 2009, which is hereby incorporated by reference herein in its entirety.

BACKGROUND OF THE INVENTION

1. Field of the Invention

The present invention relates to a card connector in which cards of different sizes can be installed through one card insertion slot, and more specifically, to a card connector in which an actuator configured to sort cards in accordance with the sizes of the cards enables movement of a movable plate configured to guide each card upward and downward.

2. Description of the Related Art

In connection with electronic apparatuses and information terminal apparatuses, card connectors are known in which a card with a built-in integrated circuit (hereinafter simply referred to as an "IC card") used as a CPU or a memory is installed in order to enhance the functions of the electronic apparatus. On the other hand, various types of IC cards for installation in the card connector have emerged; the IC cards vary in size, shape, and the positions where external contact points are arranged. In association with the wide variety of emerging IC cards, there has been a demand for a card connector in which many types of IC cards can be installed.

For example, a card connector disclosed in Japanese Patent Laid-Open No. 2001-135385 is used for IC cards having different thicknesses but almost the same length and including pads corresponding to external contact points and the positions of which are the same for all the IC cards so as to allow contacts to be shared by the different types of IC cards. A card connector disclosed in Japanese Patent Laid-Open No. 2004-193111 is used for IC cards which vary in thickness, width, length, or pad position and in which contacts are arranged in a card insertion direction depending on the length of the IC card. A card connector disclosed in Japanese Patent Laid-Open No. 2004-206963 is used for IC cards which have different thicknesses and widths but almost the same length and which vary in pad position.

The card connector proposed in Japanese Patent Laid-Open No. 2004-206963 allows two types of IC cards with different shapes to be selectively installed therein, and includes an intervening partition plate configured to allow each IC card to reliably contact corresponding contacts. The card connector determines the size of the inserted IC card (specifically, the width of the IC card) to allow the partition plate to be actuated so that the IC card is guided to a predetermined position. The partition plate in the card connector extends from a recognition means (specifically, a card guide) for determining a difference in size among IC cards to an end wall of a connector main body positioned opposite a card insertion slot. Moreover, the card connector is configured such that the two types of IC cards are both inserted into the card connector in a normal insertion posture (in other words the pads face downward).

When the two types of IC cards are thus inserted into the card connector in the same posture, the contacts for the IC card installed over the partition plate are arranged at the midpoint of the height of the card connector. Thus, the contacts need to be accurately installed in order to provide a desired electric contact pressure between the IC card and contacts. Furthermore, the relationship between the partition plate and the contacts arranged above and below the partition plate contributes to limiting reduction of the overall height of the card connector.

An object of the present invention is to provide a card connector of a type including a partition plate configured to enable two types of IC cards with different shapes to be installed therein, thus allowing an appropriate electric contact pressure to be exerted between each IC card and the corresponding contacts. Furthermore, the card connector according to the present invention allows a reduction in the height of the card connector.

SUMMARY OF THE INVENTION

To accomplish the above-described object, the present invention provides a card connector in which a base member and a cover member form a card accommodation space with a card insertion slot and in which two types of cards, a large card and a small card, are capable of being selectively installed in the card accommodation space, the card insertion slot including paired first guideways along which the large card is guided and paired second guideways along which the small card is guided, the card connector including a plurality of contacts including a plurality of first contacts for the large card which include contact points arranged so as to face downward in the card accommodation space and a plurality of second contacts for the small card which include contact points arranged so as to face upward in the card accommodation space, paired lock brackets configured to detect the width of the large card provided in the first guideways to move from a first position to a second position, an actuator configured to engage with the paired lock brackets and to be rotatable from the first position to the second position, the actuator including at least an engagement portion and a passage opening through which the small card is capable of passing, and a partition member including a partition plate configured to be movable from the first position to the second position and a driving piece configured to engage with the engagement portion, the partition member sorting the inserted large and small cards to an upper part and a lower part, respectively, of the card accommodation space, wherein when the large card is inserted into the card connector with an external contact oriented upward, the lock bracket is moved from the first position to the second position to enable the actuator to be rotated, and when the large card is further fed into the card connector, the actuator is rotated from the first position to the second position to move the partition plate from the first position to the second position, thus allowing the large card to be guided to the upper part of the card accommodation space.

According to the present invention, preferably, a pair of the engagement portions is formed on the actuator, and a pair of the driving pieces configured to engage with the respective paired engagement portions is formed on the partition plate.

Furthermore, according to the present invention, the engagement portion preferably includes a recess portion formed therein and with which the driving piece is engaged.

Moreover, in the card connector according to the present invention, preferably, the partition member is movable to a third position, and includes paired elongate spring receiving portions on respective opposite sides of the partition plate, and the partition plate is biased to the first position by paired pushup springs provided on the base member and corresponding to the paired elongate spring receiving portions.

Additionally, in the card connector according to the present invention, the partition member further includes a vertical guide piece and at least paired regulation pieces so as to allow the partition plate to be guided upward and downward and to allow elevation of partition plate to be regulated.

In the card connector according to the present invention, the second contact and the paired pushup springs may be formed as inserts embedded in the base member.

The present invention includes a lock bracket and a actuator to allow two types of cards, large and small cards, to be prevented from being incorrectly inserted. Furthermore, a partition member moves upward and downward to allow the two types of cards, the large and small cards, to be reliably sorted. Additionally, the height of the card connector can be reduced. Moreover, the present invention allows cards to be inserted into the card connector both in a normal state and in a reverse state. This allows the contacts to be significantly displaced so as to reliably achieve electric contact, and enables a reduction in the height of the card connector. Furthermore, the present invention utilizes the rotation of the actuator to move the partition member. This enables a reduction in the number of components required, and allows the configuration of the card sorting mechanism to be simplified. Moreover, the present invention uses, pushup springs to bias the partition member upward and provides the vertical guide piece and the regulation pieces. This enables the partition member to be reliably moved upward and downward and allows the electric contact between each of the large and small cards and the corresponding contacts to be ensured.

Further features of the present invention will become apparent from the following description of the exemplary embodiments (with reference to the attached drawings).

BRIEF DESCRIPTION OF THE DRAWINGS

FIG. 6A is a top view of the card connector in which an IC card has come into contact with lock brackets to cancel a locked state and from which the cover member has been removed as in the case of FIG. 4;

FIG. 6B is a sectional view taken along line VIB-VIB in FIG. 6A;

FIG. 8A is a top view similar to FIG. 6A, showing the card connector in which the actuator has finished rotating, with the tip portion of the IC card starting to climb onto the partition plate;

FIG. 8B is a sectional view taken along line VIIIB-VIIIB in FIG. 8A;

DESCRIPTION OF THE EMBODIMENTS

A preferred embodiment of the present invention will be described below with reference to FIG. 1 to FIG. 14.

Figure 1:
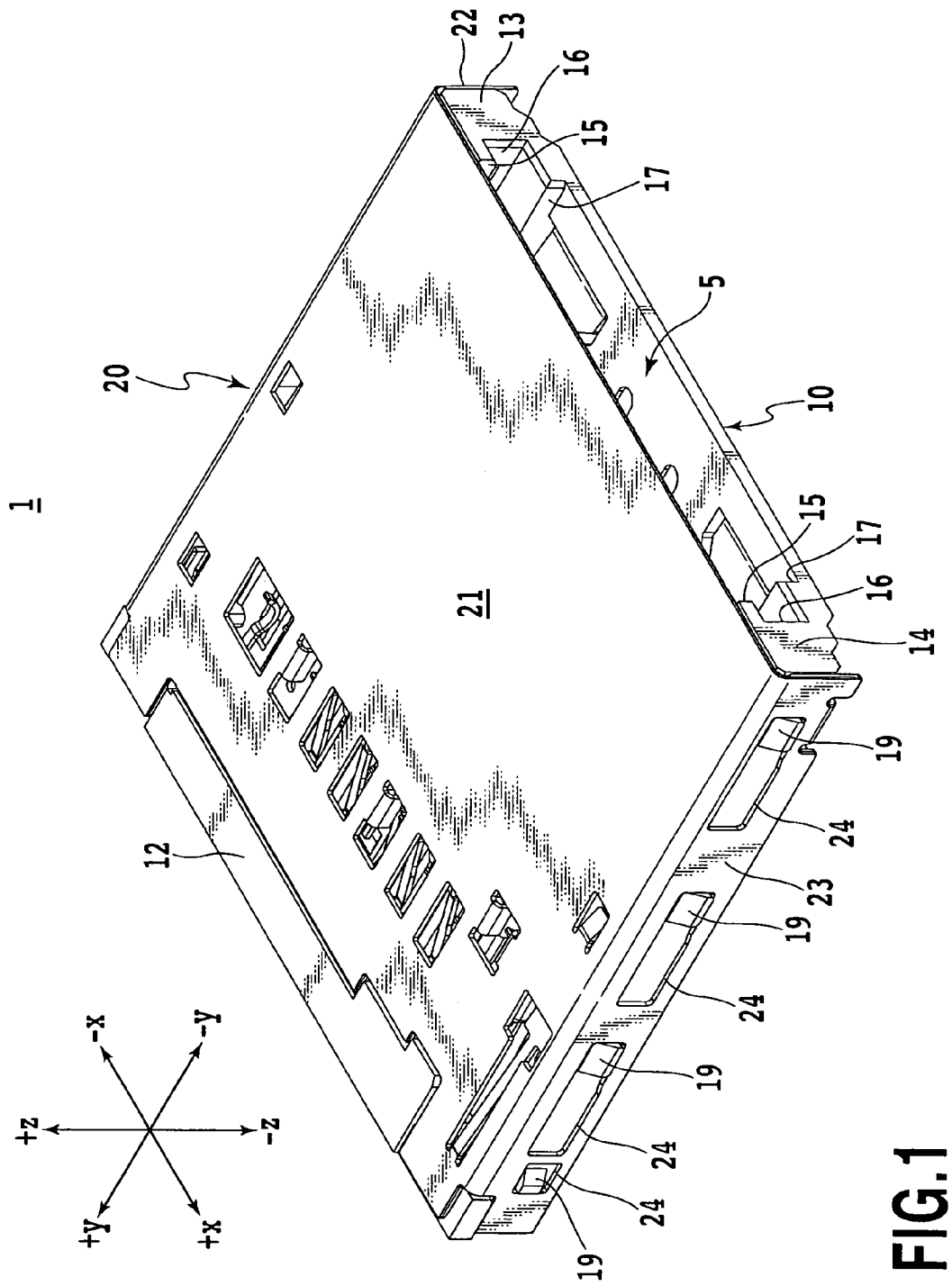
FIG. 1 is a perspective view of a card connector according to the present invention.
Figure 2:
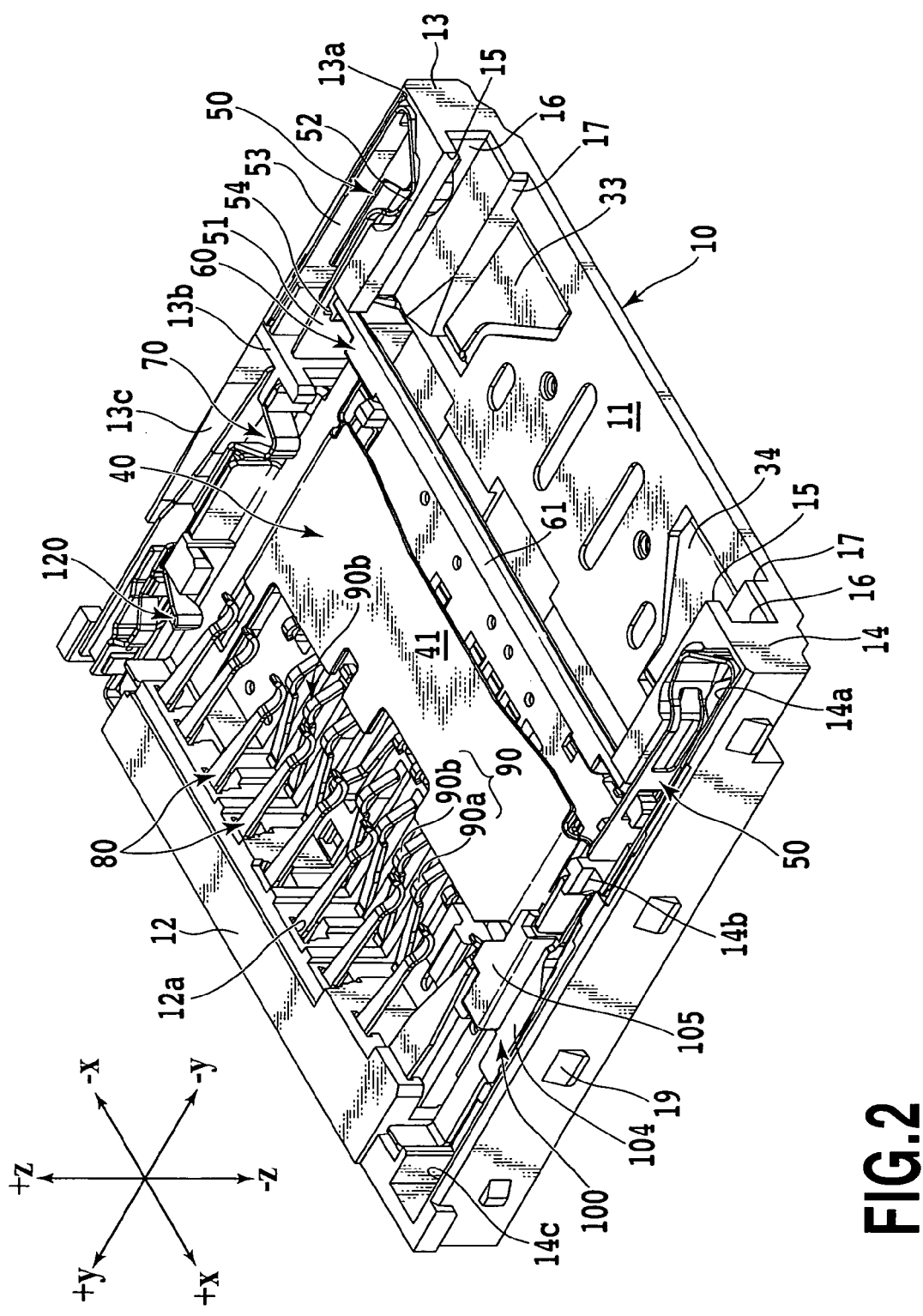
FIG. 2 is a perspective view of the card connector shown in FIG. 1 and from which a cover member has been removed.
Figure 3A:
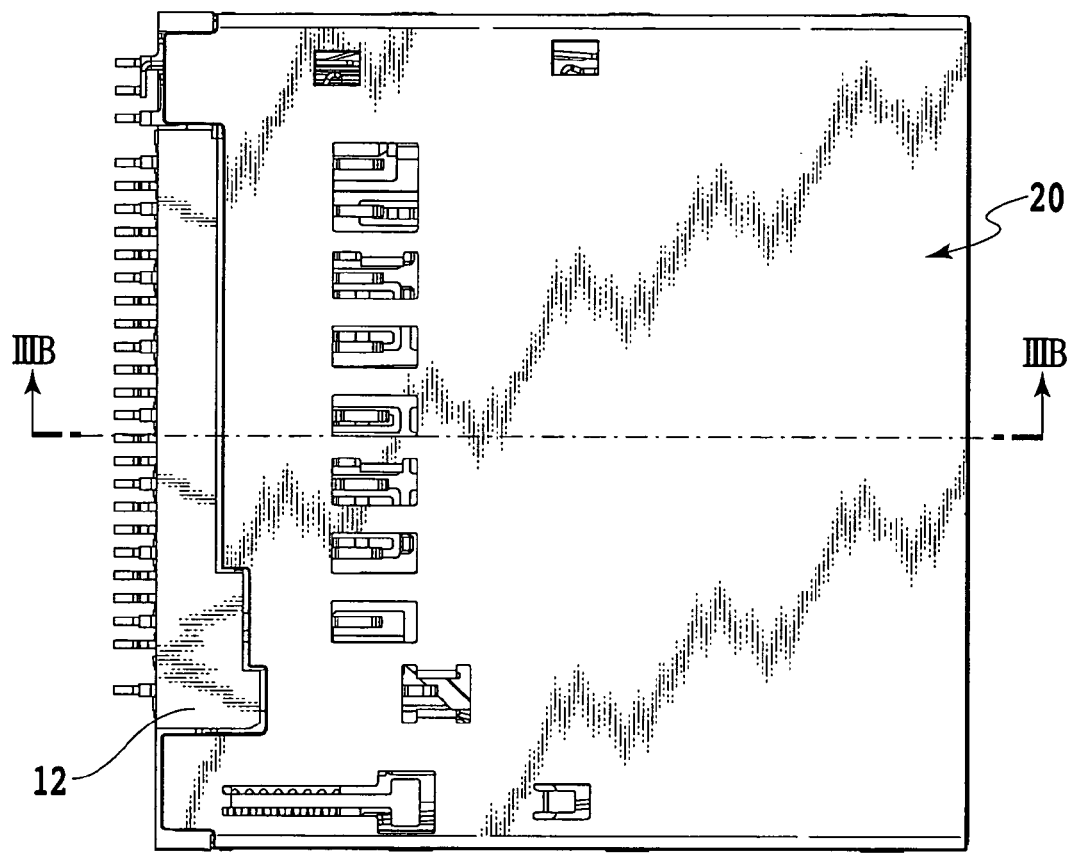
FIG. 3A is a top view of the card connector shown in FIG. 1.
Figure 3B:
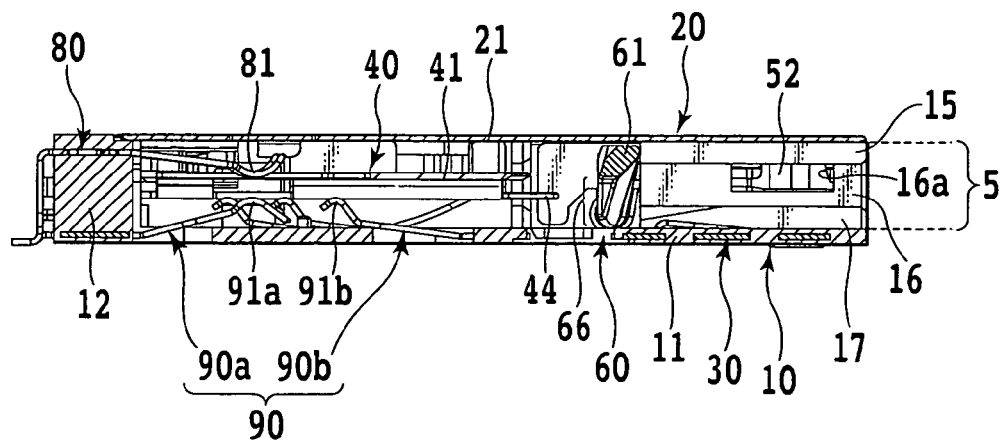
FIG. 3B is a sectional view taken along line IIIB-IIIB in FIG. 3A.
Figure 4:
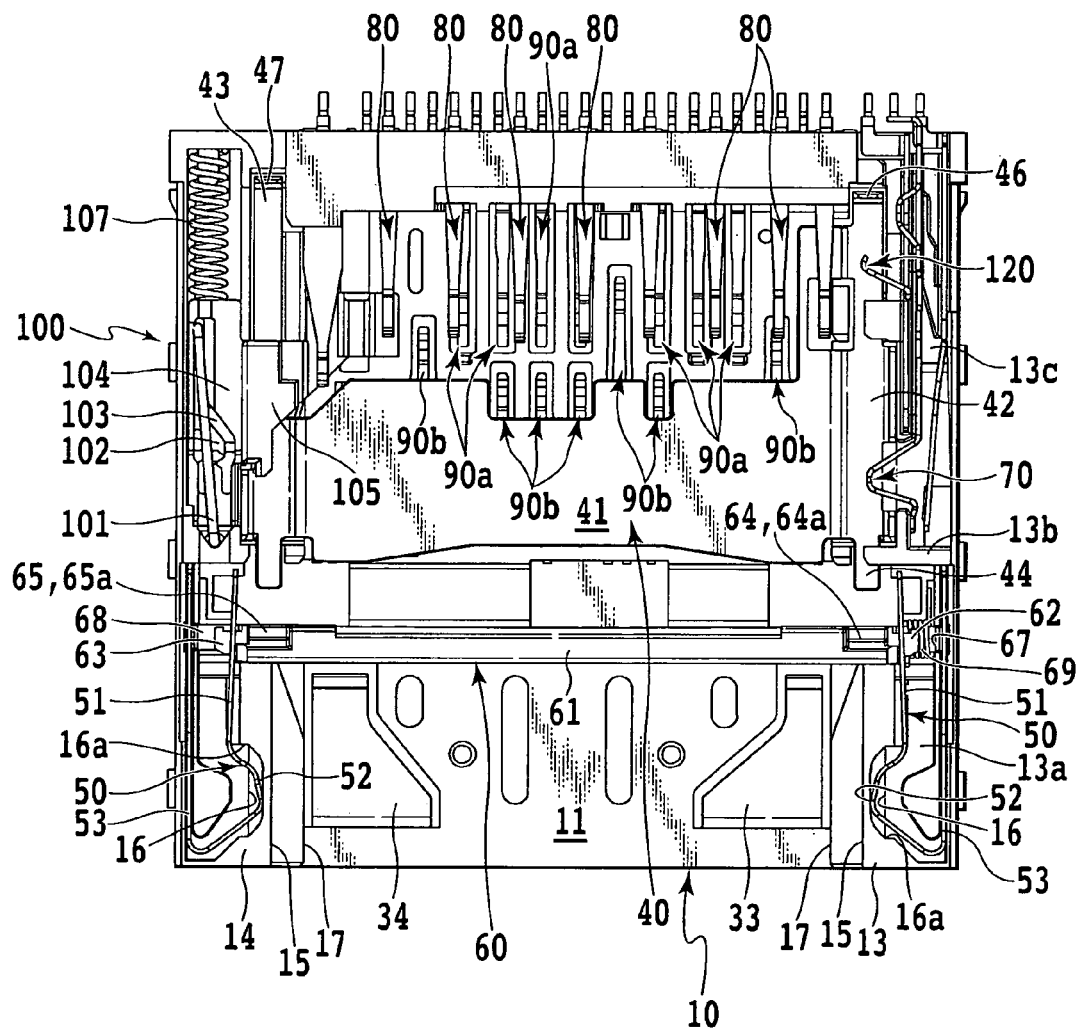
FIG. 4 is a top view of the card connector in FIG. 2.
Figure 5A:
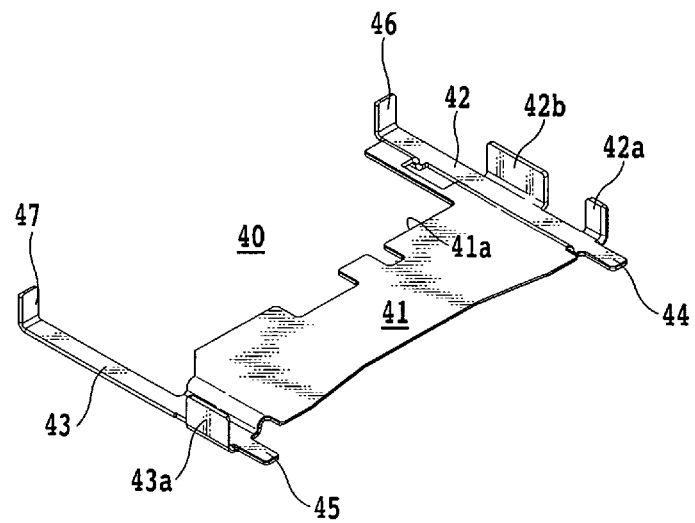
FIG. 5A is a perspective view of a partition plate used for the card connector in FIG. 1.
Figure 5B:
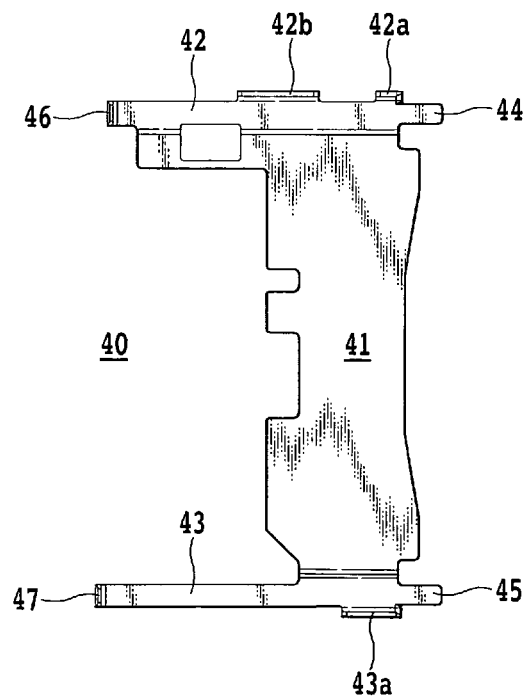
FIG. 5B is a top view of the partition plate shown in FIG. 5A.
Figure 14A:
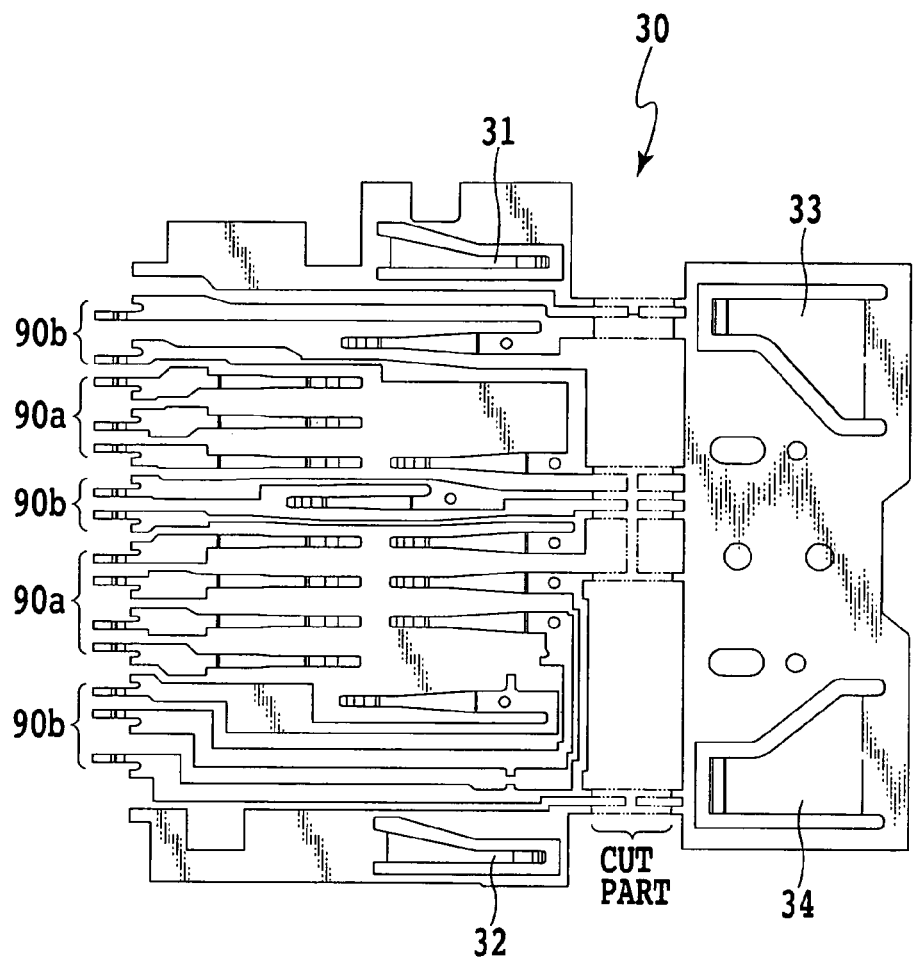
FIG. 14A is a top view of an insert embedded in base member.
Figure 14B:
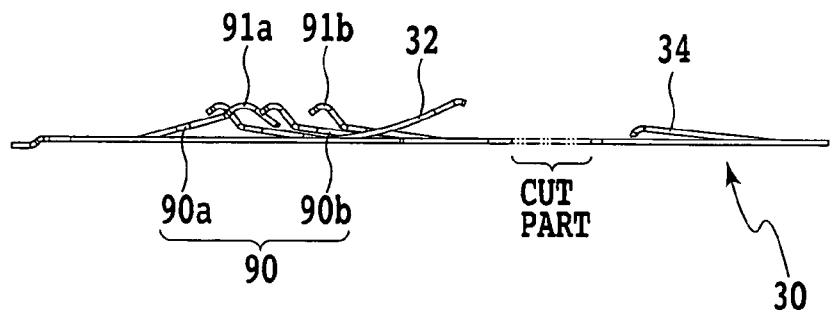
FIG. 14B is a side view of the insert shown in FIG. 14A.

First, the configuration of a card connector will be described. FIG. 1 is a perspective view of the card connector according to the present invention. FIG. 2 is a perspective view of the card connector from which a cover member has been removed. FIG. 3A is a top view of the card connector shown in FIG. 1. FIG. 3B is a sectional view taken along line IIIB-IIIB in FIG. 3A. FIG. 4 is a top view of the card connector. FIG. 5A is a perspective view of a partition plate used for the card connector. FIG. 5B is a top view of the partition plate shown in FIG. 5A. FIG. 14A is a top view of an insert embedded in a base member. FIG. 14B is a side view of the insert shown in FIG. 14A.

In the description below, the terms "left" and "right" refer to the +x direction and −x direction, respectively, in the coordinate system shown in FIGS. 1 and 2. The terms "front" and "rear" refer to the +y direction and −y direction, respectively, shown in FIG. 1. The terms "upward" and "downward" refer to the +z direction and −z direction, respectively, shown in FIG. 1.

The card connector according to the present invention is such that two types of IC cards 200 and 300 (see FIGS. 6A and 6B and FIGS. 11A and 11B) with different sizes (for example, different thicknesses or widths) can be selectively installed in the card connector 1. One of the IC cards used in the present embodiment, the IC card (hereinafter simply referred to as the "large card") 200, is, for example, an SD (Secure Digital) card, which is wide and thick. The other IC card, the IC card (hereinafter simply referred to as the "small card") 300, is, for example, a Memory Stick Duo (registered trade mark) or Memory Stick PRO-HG Duo, which is narrower and thinner than the large card. However, the IC cards used are not limited to those described above. The two types of IC cards 200 and 300 have only to vary at least in width and pad arrangement.

In the present embodiment, the large card 200 is an IC card with a wide upper portion 201 and a narrow lower portion 202 and thus both the left and right sides have a stepped shape. In the present embodiment, as shown in FIG. 6A to FIG. 10, the large card 200 is installed in the card connector 1 in a reverse state, in which a surface of the large card 200, on which pads 203 serving as external contacts are formed, faces upward (in other words, the large card 200 is turned upside down). On the other hand, the small card 300 is an ID card with an upper portion and a lower portion narrower than the upper and lower portions 201 and 202, respectively, of the large card 200. In the present embodiment, the small card is installed in the card connector 1 in a normal state in which a surface of the small card, on which pads (not shown in the drawings) serving as external contacts are formed, is oriented downward.

The card connector 1 generally includes a base member 10, a cover member 20, a partition member 40, a lock bracket 50, an actuator 60, a plurality of contacts 80 and 90, and an ejector mechanism 100. In the present embodiment, the card connector 1 may further include a write protect switch 70 and a card recognition switch 120.

The cover member 20 generally includes a top plate 21, a right side wall 22, and a left side wall 23 and has a substantially inverted-U vertical cross section. The cover member 20 is formed by using press working to punch and bend a thin metal plate. A plurality of mounting holes 24 are formed in each of the right and left side walls 22 and 23 of the cover member 20. The mounting holes 24 engage with corresponding projections 19 formed on each of a right side wall 13 and a left side wall 14 of a base member 10 described below, to form the card connector 1. That is, as shown in FIG. 1, the cover member 20 is laid on top of the base member 10 to form an IC card accommodation space with a card insertion slot 5 that is open backward.

The base member 10 includes a bottom wall 11, a front wall 12, and the right and left side walls 13 and 14, and is shaped generally like a box. The base member 10 is formed of plastic, which is electrically insulated. Furthermore, a metal insert 30 described below (see FIGS. 14A and 14B) is embedded in the bottom wall 11 of the base member 10 by insert molding. As described above, the base member 10 is laid on bottom of the cover member 20 to form the IC card accommodation space. The IC card accommodation space includes the IC card insertion slot 5 that is open backward.

A plurality of through-holes 12a penetrating the front wall 12 in a front-rear direction is formed in the upper part of the front wall 12 of the base member 10. A plurality of first contacts 80 corresponding to the respective pads on the large card 200 are pressed in the respective through-holes 12a. Thus, the plurality of first contacts 80 are supported, like cantilevers, by the front wall 12 so that respective contact points 81 can be displaced upward and downward. The contact points 81 projecting from the contacts 80 and shaped like circular arcs are supported so that the circular arc projecting portions are directed downward.

Paired guideways are formed in the right and left side walls 13 and 14, respectively, so that the two types of IC cards with different widths are guided along the guideways into the card accommodation space. In the present embodiment, an upper-stage guideway 15, a middle-stage guideway 16, and a lower-stage guideway 17 are formed on a side of each of the right and left side walls 13 and 14 which faces the card accommodation space; the paired upper-stage guideways 15, the paired middle-stage guideways 16, and the paired lower-stage guideways 17 are formed in the right and left side walls 13 and 14, respectively. The upper-stage guideway 15, the middle-stage guideway 16, and the lower-stage guideway 17 are each perpendicular to the bottom wall 11 and are formed parallel to one another. The two adjacent guideways form a step.

The paired upper-stage guideways 15 formed in the right and left side walls 13 and 14, respectively, each have almost the same width as or a slightly larger width than that of the lower portion 202 of the large card 200. Similarly, the paired middle-stage guideways 16 each have almost the same width as or a slightly larger width than that of the upper portion 201 of the large card 200. The paired lower-stage guideways 17 each have almost the same width as or a slightly larger width than that of the small card. That is, the upper-stage guideway 15 and the middle-stage guideway 16 correspond to a first guideway along which the large card 200 in the reverse state is guided. The lower-stage guideway 17 corresponds to a second guideway along which the small card 300 is guided.

Paired lock brackets 50 are provided behind the right and left side walls 13 and 14, respectively, of the base member 10. In the present embodiment, the paired lock brackets 50 are arranged in respective rear accommodation grooves 13a and 14a formed in the rear parts of the right and left side walls 13 and 14, respectively, so as to lie laterally symmetrically opposite each other (the rear accommodation grooves 13a and 14a are formed closer to the card insertion slot 5).

The paired lock brackets 50 have the same shape. Here, the right lock bracket 50 located in the rear accommodation groove 13a of the right side wall 13 will be described. Description of the left lock bracket 50 located in the rear accommodation groove 14a of the left side wall 14 is omitted.

The lock bracket 50 includes an elastic deformation piece 51 located on a card accommodation space side (inner side) of the rear accommodation groove 13a and a fixed piece 53 located on a side (outer side) far from the card accommodation space. The elastic deformation piece 51 and the fixed piece 53 are parallel to each other and are coupled to each other at the rear parts thereof so as to generally have a substantially U-shaped horizontal cross section. A contact portion 52 is provided near the rear part of the elastic deformation piece 51 which is coupled to the fixed piece 53; the contact portion 52 projects into the card accommodation space through an opening 16a formed in the middle-stage guideway 16 of the right side wall 13 near the card insertion slot 5. An opening 54 to be engaged with a projecting pin 62 (63) of an actuator 60 described below is formed on a front free end side of the elastic deformation piece 51. Specifically, the lock bracket 50 is formed by using press working to punch a thin metal plate to obtain an elongate plate and then to fold the elongate plate. The lock bracket 50 is supported in the rear accommodation groove 13a of the left side wall 13 by using an appropriate technique to fix the fixed piece 53 in the rear accommodation groove 13a of the left side wall 13 (in the present embodiment, pressing the fixed piece 53 in a predetermined recessed groove). The rear accommodation groove 13a is formed such that the groove 13a as a whole communicates with the card accommodation space, within an area of the groove 13a located in front of a part thereof corresponding to the opening 54 in the elastic deformation piece 51 and extending to a partition wall 13b. Thus, the paired upper-stage guideways 15, the paired middle-stage guideways 16, and the paired lower-stage guideways 17 extend from the card insertion slot 5 to a position immediately in front of the part of the rear accommodation groove 13a corresponding to the opening 54 in the elastic deformation piece 51.

When the paired lock brackets 50 are assembled into the card connector 1, in other words, when the large card 200 is not installed in the card connector 200, the paired lock brackets 50 are placed in a first portion where paired contact portions 52 of the paired elastic deformation pieces 51 are closed as shown in FIG. 4. With the paired lock brackets 50 thus arranged, when the upper portion 201 of the large card 200 is guided along the paired middle-stage guideways 16, the paired contact portions 52 are pushed out from the card accommodation space by the large card 200. That is, the paired lock brackets 50 move to a second position where the paired contact portions 52 are open. The exit (push-out) of the paired contact portions 52 from the card accommodation space causes the paired elastic deformation pieces 51 to be displaced so as to laterally open the front free ends of the paired elastic deformation pieces 51. Then, the projecting pins 62 of the actuator 60 are removed from the openings 54 formed at the front free ends of the paired elastic deformation pieces 51. This enables the actuator 60 to move pivotally.

A front accommodation groove 13*c* is formed, via the partition wall 13*b*, in front of the rear accommodation groove 13*a* in the left side wall 13 of the base member 10. The write protect switch 70 and card recognition switch 120 both formed to partly project into the card accommodation space are arranged in the front accommodation groove 13*c* in the left side wall 13.

A front accommodation groove 14*c* is formed, via the partition wall 14*b*, in front of the rear accommodation groove 14*a* in the right side wall 14. The eject mechanism 100 is located in the front accommodation groove 14*c* in the right side wall 14 to assist discharging the IC card 200 or 300 installed in the card accommodation space.

The eject mechanism 100 according to the present embodiment is of a conventional, well-known push-push type and will be described in brief. In the present embodiment, the eject mechanism 100 generally includes a swinging arm 101, an eject member 104, a card abutting member 105, and a compression coil spring 107.

The swing arm 101 included in the eject mechanism 100 functions as a cam follower with one end swingably supported by the partition wall 14*b* and the other end guided through a cam groove 103 formed in the eject member 104. As shown in FIG. 4, a heart cam 102 and a cam groove 103 are formed on the top surface of the eject member 104. The eject member 104 is accommodated in the front accommodation groove 14*c* formed in front of the partition wall 14*b* of the right side wall 14, so as to move slidably forward and rearward through the front accommodation groove 14*c*. Thus, the front accommodation groove 14*c* in the right side wall 14 is longer than the eject member 104. The card abutting member 105 is coupled to the eject member 104 and formed so as to project into the card accommodation space. At least a part of the card abutting member 105 is formed so as to able to come into abutting contact with the front end of the installed IC card 200 or 300 and to move forward and rearward together with the eject member 104. In the present embodiment, the card abutting member 105 is located so as to be movable forward and rearward, when assembled into the card connector, on the left spring receiving portion 43 of the elongate paired spring receiving portions formed lower than a partition plate 41 of the partition member 40 described below. Furthermore, the card abutting member 105 includes a groove extending in the front-rear direction and formed in a part thereof corresponding to the contacts 80 so as to prevent forward and rearward movement of the card abutting member 105 from being hindered. Furthermore, in the front accommodation groove 14*c* in the right side wall 14 in which the eject member 104 is accommodated, at least a part of the front accommodation groove 14*c* in which the coupling member 105 moves forward and rearward is preferably formed so as to communicate with the card accommodation space. The compression coil spring 107 is located in the front of the front accommodation groove 14*c* in the right side wall 14 to bias the eject member 104 rearward. The functions and advantages of the eject mechanism 100 are well known and will thus not described below.

The plurality of second contacts 90 corresponding to the respective plural pads on the small card 300 are supported like cantilevers in front of the bottom wall 11 of the base member 10. In the present embodiment, the plurality of second contacts 90 are formed as inserts 30, as shown in FIGS. 14A and 14B. The second contacts 90 are insert-molded when the base member 10 is manufactured so that a predetermined part of each of the second contacts 90 is embedded in the bottom wall 11. In the present embodiment, the second contacts 90 are arranged in a front row and a rear row corresponding to the arrangement of the pads on the small card 300 as shown in FIGS. 14A and 14B. In FIG. 14B, reference numeral 90*a* denotes contacts arranged in the front row. Reference numeral 90*b* denotes contacts arranged in the rear row. The plurality of second contacts 90*a* and 90*b* arranged in the front and rear rows, respectively, are supported like cantilevers such that contact points 91*a* and 91*b* of the second contacts 90*a* and 90*b* can be displaced upward and downward (see FIG. 3B). To increase the amount by which the contact points 91*a* and 91*b* of the contacts 90*a* and 90*b* are displaced, the bottom wall 11 includes openings penetrating the bottom wall 11 and formed in the respective areas thereof corresponding to respective parts of the contacts 90 and 90*b* supported like cantilevers. Furthermore, the contact points 91*a* and 91*b* of the contacts 90*a* and 90*b* formed so as to project like circular arcs are supported so that the circular arc projecting portions are directed upward.

Each of the inserts 30 embedded in the bottom wall 11 of the base member 10 includes paired pushup springs 31 and 32 formed on the respective laterally opposite sides of the second contact 90 to support the partition member 40 described below so that the partition member 40 is directed upward. Since the pushup springs 31 and 32 support the partition member 40 in such a way that the partition member 40 is directed upward, the inserted small card 300 is prevented from interfering with the rear end of the partition member 40. Contact point portions of the pushup springs 31 and 32 which come into abutting contact with the partition member 40 are preferably positioned in front of paired driving pieces 44 and 45 described below and behind the contact points of the contacts (the contact point portions are located closer to the insertion slot 5 than the contact points). Thus, for example, the actuator 60 can reliably lower the partition member 40 and assuredly prevent the small card 300 from interfering with the rear end of the partition member 40. Moreover, the pushup springs 31 and 32 can be prevented from interfering with the actuator 60. Furthermore, paired pressure springs 33 and 34 are formed behind the second contacts 90 and on the respective laterally opposite sides thereof to prevent the small card 300 from popping out when the small card 300 is removed from the card connector 1. The pushup springs 31 and 32 and the pressure springs 33 and 34 are fixed to predetermined positions on the bottom wall 11 by insert molding and supported on the bottom wall 11 like cantilevers similarly to the second contacts 90.

Each of the inserts 30 is integrally formed by using press working to punch a thin metal plate so as to form the plurality of second contacts 90 (90*a* and 90*b*), the pushup springs 31 and 32, and the pressure springs 33 and 34 on the thin metal plate. However, after the insert molding, for example, as shown in FIGS. 14A and 14B, predetermined parts of the insert 30 are cut such that the contacts, the pushup springs, and the pressure springs can function independently.

Now, the partition member 40 will be described, which is configured to sort the installed IC card (in the present embodiment, the large card 200 or the small card 300) to the different areas. The partition member 40 has the function of sorting the installed IC card to the different areas and reliably holding the installed IC card. That is, the IC card installed over the partition member 40 is firmly sandwiched between the cover member 20 and the partition member 40. The IC card installed under the partition member 40 is firmly sandwiched between the partition member 40 and the base member 10. This ensures a contact pressure required for the electric contact between each of the IC card and the contacts. The partition member 40 is shown in FIGS. 5A and 5B in detail.

The partition member 40 includes the partition plate 41, the elongate paired spring receiving portions 42 and 43, the paired driving pieces 44 and 45, and paired regulation pieces 46 and 47. The partition member 40 moves upward and downward in a part of the card accommodation space located in front of a line joining the partition walls 13b and 14b of the right and left side walls 13 and 14. The partition member 40 thus allows the IC cards with different sizes to be sorted and guided to an upper area and a lower area, respectively, in the card accommodation space.

The partition plate 41 is flat and is placed, when assembled into the card connector 1, in a first position that traverses the card accommodation space as shown in FIGS. 2, 3B, and 4. In this case, the partition plate 41 is preferably located such that the height of the bottom surface of the partition plate 41 from the bottom wall 11 is almost the same as the thickness of the small card 300. In the present embodiment, the partition plate 41 is provided higher than the paired spring receiving sections 42 and 43. This configuration allows the small card 300 to be guided along a vertical step portion connecting the opposite sides of the partition plate 41 to the respective paired spring receiving portions 42 and 43. Thus, the width of the partition plate 41 is the same as that of the small card 300. Furthermore, since the partition plate 41 is located higher than the paired spring receiving portions 42 and 43, the card abutting member 105 of the eject mechanism 100 can come into abutting contact with the small card 300. This enables the eject mechanism 100 to be shared by the large and small cards. To avoid interfering with the first and second contacts 80 and 90 and the eject mechanism 100 even when moved upward or downward, the partition plate 41 is appropriately shaped such that, for example, a substantially rectangular front cutout 41a is formed in the partition plate 41.

The elongate paired spring receiving portions 42 and 43 are provided on the respective laterally opposite sides of the partition plate 41 so as to lie opposite the respective paired pushup springs 31 and 32 provided on the bottom wall 11 of the base member 10 when assembled into the card connector. Thus, the paired spring receiving portions 42 and 43 are biased upward by the respective paired pushup springs 31 and 32. As a result, the partition member 40 is normally placed in a first position where the partition member 40 is pushed upward. In the present embodiment, as described above, the paired spring receiving portions 42 and 43 are provided lower than the partition plate 41. The sum of the length of the partition plate 41 and the length of the paired spring receiving portions 42 and 43 provided on the respective laterally opposite sides of the partition plate 41, that is, the width of the partition member 40, is set almost equal to the width of the large card 200.

Vertical guide pieces 42a, 42b, and 43a are provided outside and orthogonally to the respective elongate paired spring receiving portions 42 and 43. The vertical guide pieces 42a, 42b, and 43a are provided at appropriate positions along the elongate paired spring receiving portions 42 and 43 in the front-rear direction. The vertical guide pieces 42a, 42b, and 43a move along the inner wall surfaces (which face the card accommodation space) of the right side wall 13 and left side wall 14 of the base member 10 to guide the partition member 40 upward and downward. The upward movement of the partition member 40 and thus the partition plate 41 can be regulated using the vertical guide pieces 42a, 42b, and 43a with the respective heights appropriately set, in combination with the paired regulation pieces 46 and 47 described below. That is, the vertical guide pieces 42a, 42b, and 43a and the paired regulation pieces 46 and 47 regulate such that the partition plate 41 does not move up above the first position where the height of the partition plate 41 is the same as the thickness of the small card.

The paired driving pieces 44 and 45 are provided at the rear ends of the respective elongate paired receiving portions 42 and 43 so as to extend rearward from the rear ends. The paired driving pieces 44 and 45 extend from the rear ends of the elongate paired spring receiving portions 42 and 43 by a predetermined length. Thus, when the actuator 60 moves pivotally, the paired driving pieces 44 and 45 can engage with engaging recess portions 64a and 65a formed on the respective opposite sides of the actuator 60 as paired engagement portions. As the actuator 60 rotates, the driving pieces 44 and 45 come into engagement with the respective paired engaging recess portions 64a and 65a of the actuator 60. Then, further rotation of the actuator 60 causes the paired driving pieces 44 and 45 to be pushed down against the bias force of the pushup springs 31 and 32. Thus, the partition plate 41 is tilted such that the rear part of the partition plate 41 is lower than the front part thereof (second position). Hence, upon reaching the rear end of the partition plate 41, the large card 200 can be guided onto the top surface of the partition plate 41. Thereafter, the large card 200 is also guided through the card accommodation space along the vertical guide pieces 42a, 42b, and 43a. The large card 200 pushes down the whole partition member 40, which thus moves to a third position where the partition member 40 is parallel to the bottom wall 11. The present invention is not limited to the paired driving pieces. For example, the driving piece may extend rearward from the rear end of a central part of the partition plate 41. In this case, an engagement portion may be provided on the actuator corresponding to the position of the driving piece; a single engagement portion may be provided in a central part of the actuator. However, the paired driving pieces are preferably provided on the respective opposite sides of the actuator because this configuration enables the partition member 40 to be uniformly pushed down without being laterally tilted.

The paired regulation pieces 46 and 47 extend upward from the front ends of the respective elongate paired spring receiving portions 42. The paired regulation pieces 46 and 47 are bent orthogonally to the elongate paired spring receiving portions 42. The paired regulation pieces 46 and 47 come into abutting contact with, for example, the inner wall surface (which faces the card accommodation space) of the front wall 12 to place the partition plate 41 and the paired driving pieces 44 and 45 at predetermined positions in the card accommodation space. Furthermore, the paired regulation pieces 46 and 47 move along the inner wall surface of the front wall 12 to guide the partition member 40 upward and downward, while regulating the upward movement of the partition member 40.

Subsequently, the actuator 60 will be described, which inhibits insertion of IC cards different from the large card and which, when the large card is inserted into the card connector, tilts the partition member 40 to guide the large card to a predetermined position in the card accommodation space.

The actuator 60 includes a shutter portion 61, paired projecting pins 62 and 63, paired leg portions 64, and paired rotating shafts 67 and 68. The actuator 60 is located across the card accommodation space so as to be rotatable in the card accommodation space. Furthermore, the actuator 60 includes a passage opening formed by the shutter portion 61 and the paired leg portions 64 and 65 and having a substantially rectangular vertical cross section. The small card 300 can pass through the passage opening 66.

When the IC card is not installed in the card connector as shown in FIG. 1 to FIG. 4, the shutter portion 61 is located so as to extend orthogonally to a card insertion direction to laterally traverse the card accommodation space, thus sealing the upper part of the card accommodation space. The paired projecting pins 62 and 63 are formed on the respective laterally opposite sides of the shutter portion 61 so as to project outward from the respective laterally opposite sides (the paired projecting pins 62 and 63 project into the corresponding right and left rear accommodation grooves 13*a* and 14*a*). When the IC card is not installed in the card connector as shown in FIG. 1 to FIG. 4, the paired projecting pins 62 and 63 engage with the openings 54 in the corresponding paired lock brackets 50 as described above. The paired projecting pins 62 and 63 engage with the openings 54 in the respective paired lock brackets 50 to inhibit pivotal movement of the actuator 60 and thus insertion of the IC card. That is, the actuator 60 cannot be pivotally moved unless the paired contact portions 52 of the paired lock brackets 50 are pushed out from the card accommodation space to displace the paired elastic deformation pieces 51 to simultaneously remove the paired projecting pins 62 and 63 from the respective paired openings 54. That is, it is impossible that the IC card itself pushes the shutter portion 61 to pivotally move and bring the actuator 60 down. This prevents the card accommodation space from being opened, thus inhibiting the IC card from being fed forward beyond the shutter portion 61.

The leg portions 64 and 65 are provided on the respective laterally opposite sides of the shutter portion 61 and inside the respective paired projecting pins 62 and 63 so as to face downward. The shutter portion 61 and the paired leg portions 64 and 65 form the passage opening 66 with a rectangular vertical cross section (see FIG. 3B). The vertical cross sectional shape of the passage opening 66 is set almost as large as or slightly larger than that of the small card 300. That is, the distance between the paired leg portions 64 and 65 is thus almost the same as that between the paired lower-stage guideways 17. The engaging recess portions 64*a* and 65*a* are formed in the front surfaces of the respective paired leg portions 64 and 65. When the actuator 60 rotates, the paired engaging recess portions 64*a* and 65*a* come into engagement with and push down the respective driving pieces 44 and 45 of the partition member 40. As a result, the rear end of the partition plate 41 is pushed down. The engaging recess portions 64*a* and 65*a* thus formed allows adjustment of the amount by which the partition plate 41 is pushed down (the difference between the position of the partition plate 41 before the pushdown and the position of the partition plate 41 after the pushdown). Thus, the partition plate 41 can be prevented from being excessively pushed down. This enables the vertical height of the connector to be reduced.

The rotating shafts 67 and 68 are formed at the lower ends of the respective paired leg portions 64 and 65 so as to project laterally outward from the lower ends. The paired rotating shafts 67 and 68 are arranged in the respective rear accommodation grooves 13*a* and 14*a* in the right and left side walls 13 and 14. The paired rotating shafts 67 and 68 traverse the bottom parts of the respective rear accommodation grooves 13*a* and 14*a* and are rotatably supported by the right and left side walls 13 and 14, respectively. A torsion coil spring 69 is wound around one or both of the paired rotating shafts 67 and 68 (in the present embodiment, only the right rotating shaft 67). The torsion coil spring 69 biases the shutter portion 61 of the actuator 60 to an upright position, that is, a first position where the shutter portion 61 closes the card accommodation space, as shown in FIG. 1 to FIG. 4.

The actuator 60 is normally located in the first position where the shutter portion 61 of the actuator 60 partly closes the card accommodation portion as shown in FIG. 1 to FIG. 4.

When the large card 200 is inserted into the card connector, the actuator 60 is disengaged from the lock brackets 50 and can then rotate around the rotating shafts 67 and 68 as described below. When the large card 200 is further fed into the card connector, the shutter portion 61 of the actuator 60 comes into abutting contact with the large card 200, which thus rotates and pushes the actuator 60 down forward. The actuator 60 thus moves rotationally to a second position where the shutter portion 61 opens the card accommodation space. Furthermore, when inserted into the card connector, the small card 300 passes through the passage opening 66 formed in the actuator 60 without rotating the actuator 60.

Figure 7A:
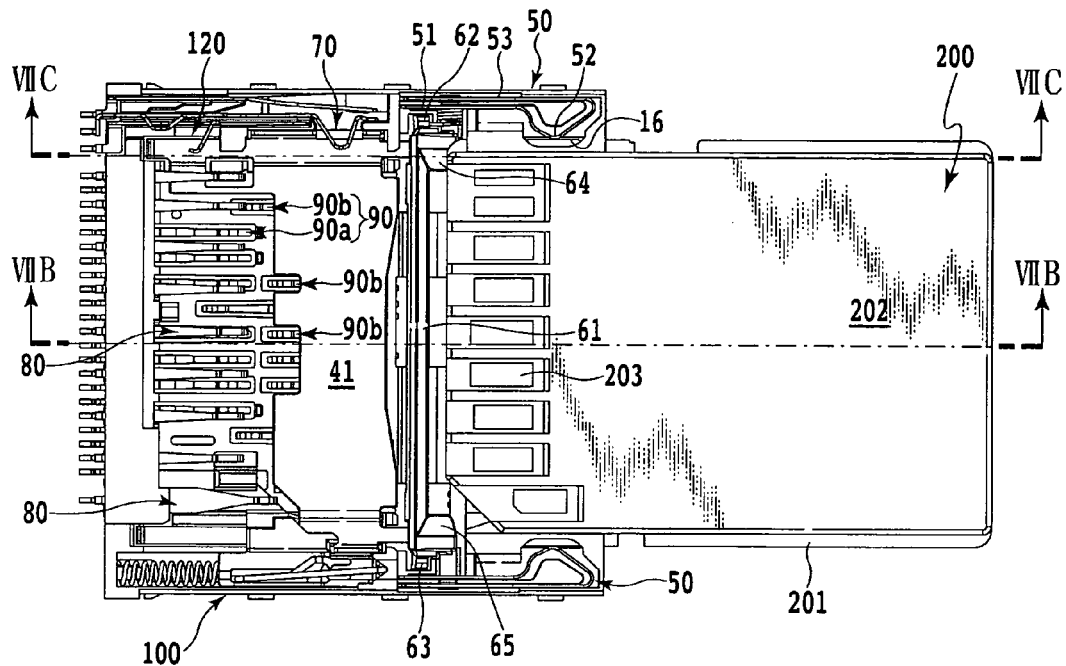
FIG. 7A is a top view similar to FIG. 6A, showing the card connector in which the actuator is rotating.
Figure 7B:
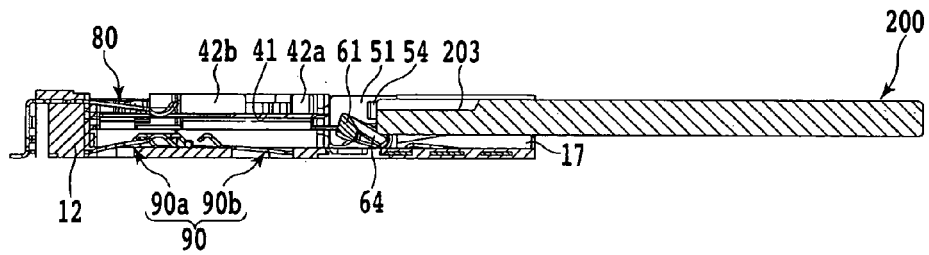
FIG. 7B is a sectional view taken along line VIIB-VIIB in FIG. 7A.
Figure 7C:
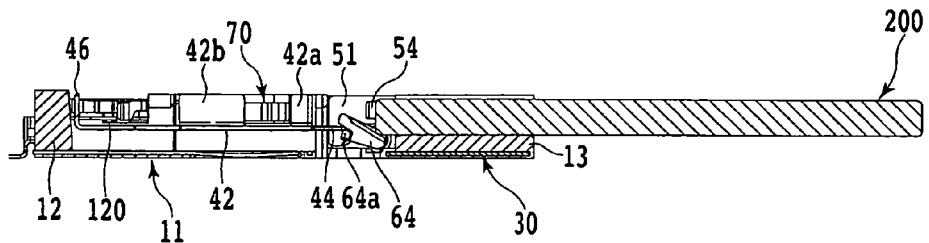
FIG. 7C is a sectional view taken along line VIIC-VIIC in FIG. 7A.
Figure 9:
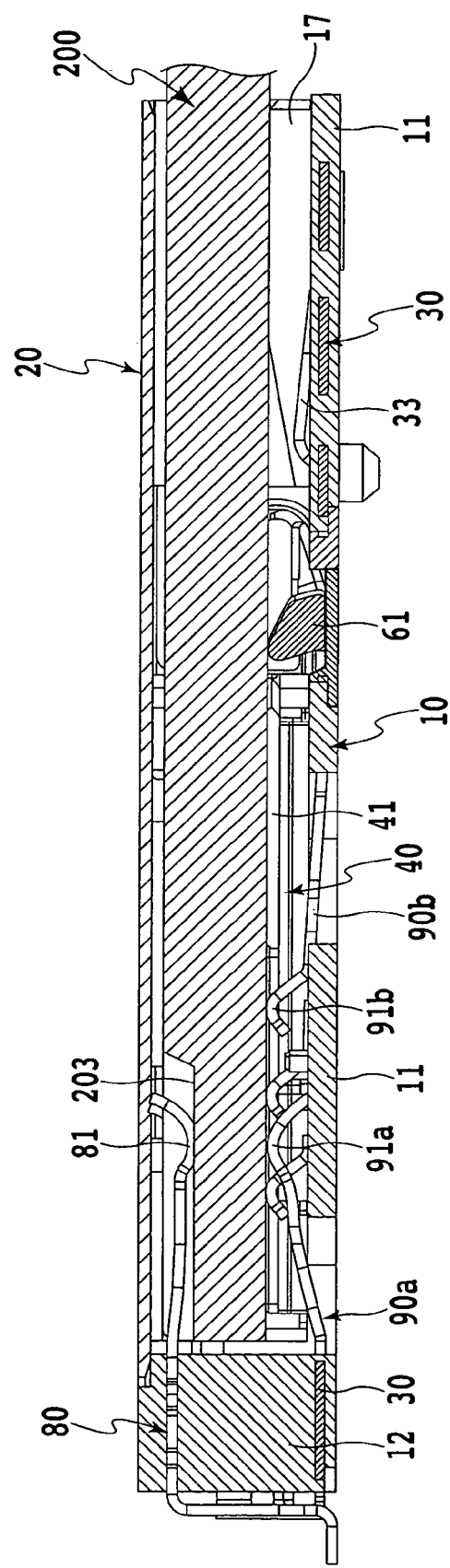
FIG. 9 is a sectional view similar to FIG. 8B, showing the card connector in which the tip of the IC card has come into abutting contact with a front wall.
Figure 10:
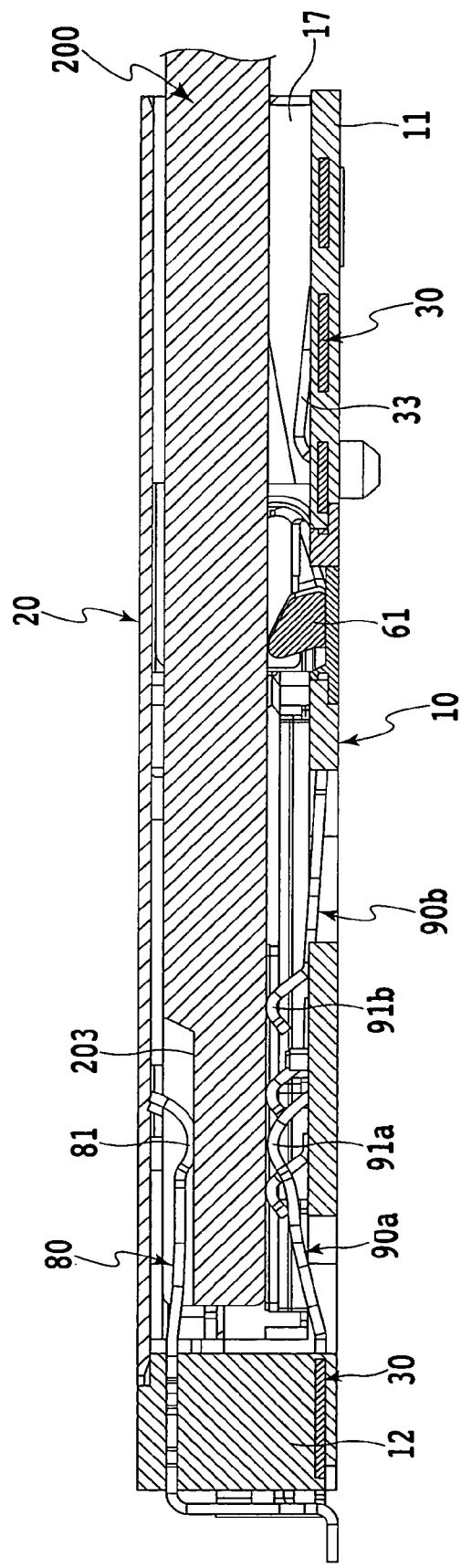
FIG. 10 is a sectional view similar to FIG. 8B, showing the card connector in which the IC card has been completely installed in the card connector.

The card connector 1 according to the present invention is configured as described below. A specific operation of selectively installing the IC card in the card connector 1 according to the present invention will be described below. First, an operation of installing the large card 200 in the card connector 1 according to the present invention will be described with reference to FIGS. 3B and 4 and FIG. 6A to FIG. 10. FIG. 6A to FIG. 10 are diagrams showing how the large-sized IC card is installed in the card connector. FIG. 6A is a top view of the card connector in which the IC card has come into contact with the lock brackets to cancel the locked state and from which the cover member has been removed as in the case of FIG. 4. FIG. 6B is a sectional view taken along line VIB-VIB in FIG. 6A. FIG. 7A is a top view of the card connector in which the actuator is rotating and from which the cover member has been removed as in the case of FIG. 6A. FIG. 7B is a sectional view taken along line VIIB-VIIB in FIG. 7A. FIG. 7C is a sectional view taken along line VIIC-VIIC in FIG. 7A. FIG. 8A is a top view of the card connector in which the actuator has finished rotating, with the tip portion of the IC card starting to climb onto the partition plate, and from which the cover member has been removed as in the case of FIG. 6A. FIG. 8B is a sectional view taken along line VIIIB-VIIIB in FIG. 8A. FIG. 9 is a sectional view similar to FIG. 8B, showing the card connector in which the tip of the IC card has come into abutting contact with the front wall. FIG. 10 is a sectional view similar to FIG. 8B, showing the card connector in which the IC card has been completely installed in the card connector.

As shown in FIGS. 3B and 4, when the large card 200 is not installed in the card connector, the lock brackets 50, actuator 60, and partition member 40 of the card connector 1 are located in the respective first positions. Specifically, the lock brackets 50 are located in the first position wherein the paired contact portions of the lock brackets 50 are closed. The actuator 60 is located in the first position where the shutter portion 61 of the actuator 60 partly closes the card accommodation space. At this time, the paired openings 54 in the paired lock brackets 50 engage with the respective paired projecting pins 62 and 63 of the actuator 60. Furthermore, the partition member 40 is located in the first position where the partition plate 41 of the partition member 40 is parallel with the bottom wall 11 of the base member 10 and in which the height of the partition plate 41 from the bottom wall 11 is almost the same as the thickness of the small card 300.

As shown in FIGS. 6A and 6B, the large card 200 is inserted through the card insertion slot 5 in the reverse state in which the surface of the large card 200 with the pads 203 formed thereon is oriented upward. That is, the large card 200 is inserted through the card insertion slot 5 so that the wide upper portion 201 of the large card 200 moves along the middle-stage guideway 16, while the narrow lower portion 202 of the large card 200 moves along the upper-stage guideway 15.

When the large card 200 is inserted forward, the wide upper portion 201 comes into contact, through the openings 16a in the middle-stage guideways 16, with the paired contact portions 52 of the paired lock brackets 50 projecting into the card accommodation space. The contact causes the paired contact portions 52 to be simultaneously retracted from the card accommodation space. That is, the paired contact portions 52 are moved to the second position. Thus, the paired elastic deformation pieces 51 of the paired lock brackets 50 are opened (moved to the second position) to simultaneously disengage the paired projecting pins 62 and 63 of the actuator 60 from the respective paired openings 54 in the paired elastic deformation pieces 51. This allows the actuator 60 to be rotated.

In the state shown in FIGS. 6A and 6B, when the large card 200 is further fed forward, the tip of the large card 200 comes into abutting contact with the shutter portion 61 of the actuator 60 as shown in FIGS. 7A and 7B. At this time, as described above, the actuator 60 is allowed to rotate. Thus, as the large card 200 is fed forward, the actuator 60 is rotated counterclockwise in FIG. 7B so as to be pushed down forward against the bias force of the torsion coil spring 69. During the rotation of the actuator 60, as shown in FIG. 7C, the engaging recess portions 64a and 65a formed in the respective paired leg portions 64 and 65 of the actuator 60 comes into engagement with the respective lateral paired driving pieces 44 and 45 of the partition member 40.

As shown in FIGS. 8A and 8B, when the large card 200 is further fed forward, the actuator 60 rotates to the second position where the actuator 60 is completely brought down. The upper part of the card accommodation space is opened such that the large card 200 can pass through the upper part. Thus, the large card 200 moves forward over the shutter portion 61.

At this time, the rotation of the actuator 60 up to the second position causes the paired driving pieces 44 and 45 to be sufficiently pushed down to tilt the partition member 40. Thus, the rear end of the partition plate 41 of the partition member 40 is pushed down. That is, the partition plate 41 is moved to the second position. Hence, the tip of the large card 200 is ready to run onto the rear end of the partition plate 41.

In the state shown in FIGS. 8A and 8B, when the large card 200 is further fed forward, the tip of the large card 200 comes into abutting contact with the card abutting member 106 of the eject mechanism 100. The large card 200 is pushed in forward against the bias force of the compression coil spring 107 of the eject mechanism 100. As shown in FIG. 9, the large card 200 is pushed in until the tip of the large card 200 reaches the front wall 12 of the base member 10.

In the state shown in FIG. 9, when the force acting to push in the large card 200 is removed, the large card 200 is held in the card accommodation space in the card connector 1 at a position to which the large card 200 has been slightly pushed back by the action of the push-push eject mechanism 100. At this time, the plurality of pads 203 on the large card 200 can come into contact with the corresponding plural first contacts 80. Furthermore, the large card 200 pushes the partition member 40 located in the card accommodation space, down to a third position via the partition plate 41 of the partition member 40 against the bias force of the paired pushup springs 31 and 32 embedded in the bottom wall 11. In other words, the partition plate 41 of the partition member 40 contacts the surface of the upper portion 201 of the large card 200 to push the large card 200 up to the third position where the large card 200 is parallel to the bottom wall 11. Thus, the plurality of pads 203 of the large card 200 can electrically contact the corresponding plural first contacts 80 at the respective appropriate pressures. When the large card 200 is installed in the card accommodation space in the card connector 1, the surface of the upper portion 201 of the large card 200 may contact the plurality of second contacts 90 for the small card 300. This configuration does not affect the large card 200 because no pad is formed on the surface of the upper portion 201 of the large cad 200 and because the surface of the upper portion 201 is not electrically conductive. Rather, the contact between the large card 200 and the plurality of second contacts 90 increases the contact pressure between the large card 200 and the first contacts 80. Consequently, the repulsive force of the contacts can be utilized.

When removing the card connector 1, the large card 200, in the state shown in FIG. 10, is pushed in again into the state shown in FIG. 9. Subsequently, in the state shown in FIG. 9, the force acting to push in the large card 200 is released. The large card 200 is then discharged from the card connector 1 under the action of the eject mechanism 100. The partition member 40, the lock brackets 50, and the actuator 60 return to the respective first positions.

Figure 11A:
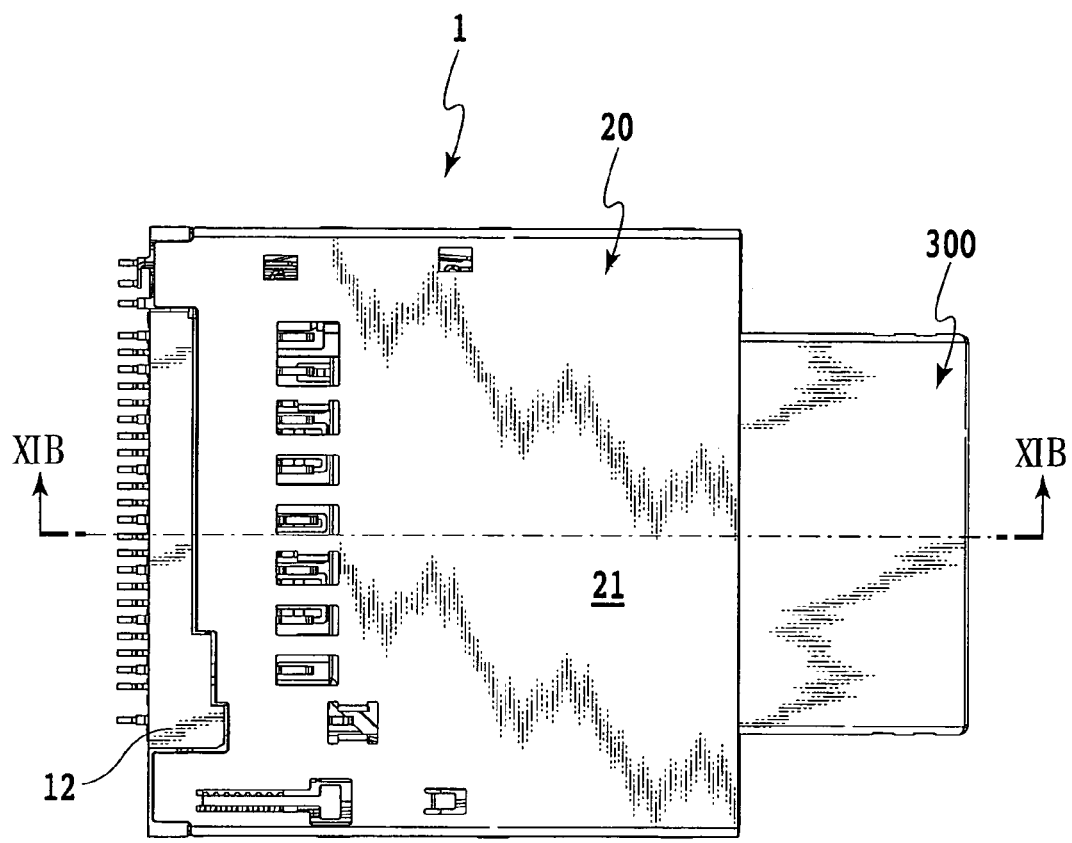
FIG. 11A is a top view similar to FIG. 3A, showing the card connector in which the IC card has been placed under the partition plate.
Figure 11B:
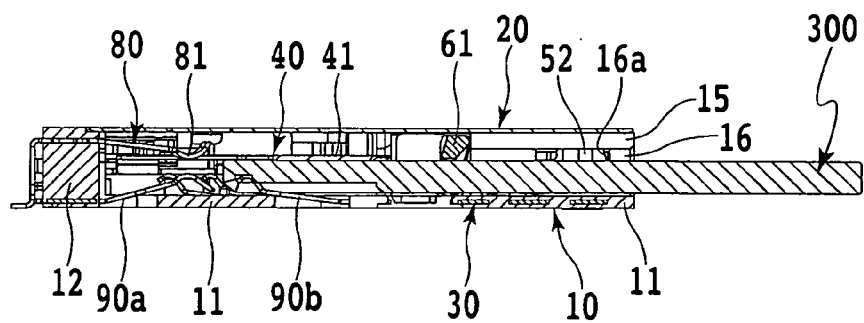
FIG. 11B is a sectional view taken along line XIB-XIB in FIG. 11A.

Now, an operation of installing the small card 300 in the card connector 1 according to the present invention will be described with reference to FIGS. 3B and 4 and FIG. 11A to FIG. 13. FIG. 11A to FIG. 13 are diagrams showing how the small-sized IC card is installed in the card connector. In FIGS. 11A and 11B, when the small card 300 is not installed in the card connector 1, the card connector 1 is in exactly the same state as that of the large card 200 as shown in FIGS. 3B and 4.

The small card 300 is inserted through the card insertion slot 5 along the lower-stage guideways 17 in the normal state in which the surface of the small card 300 with the pads 203 formed thereon is oriented downward. The inserted small card 300 is guided along the lower-stage guideways 17 and thus prevented from coming into contact with the lock brackets 50. Thus, the actuator 60 is still located in the first position. However, the small card 300 can pass through the passage opening 66 and thus advance through the card accommodation space without being interfered with. Moreover, the partition plate 41 of the partition member 40 is located in the first position the height of which is larger than the thickness of the small card 300. Thus, as shown in FIGS. 11A and 11B, the small card 300 can be inserted into the part of the card accommodation space located under the partition plate 41 of the partition member 40.

Figure 12:
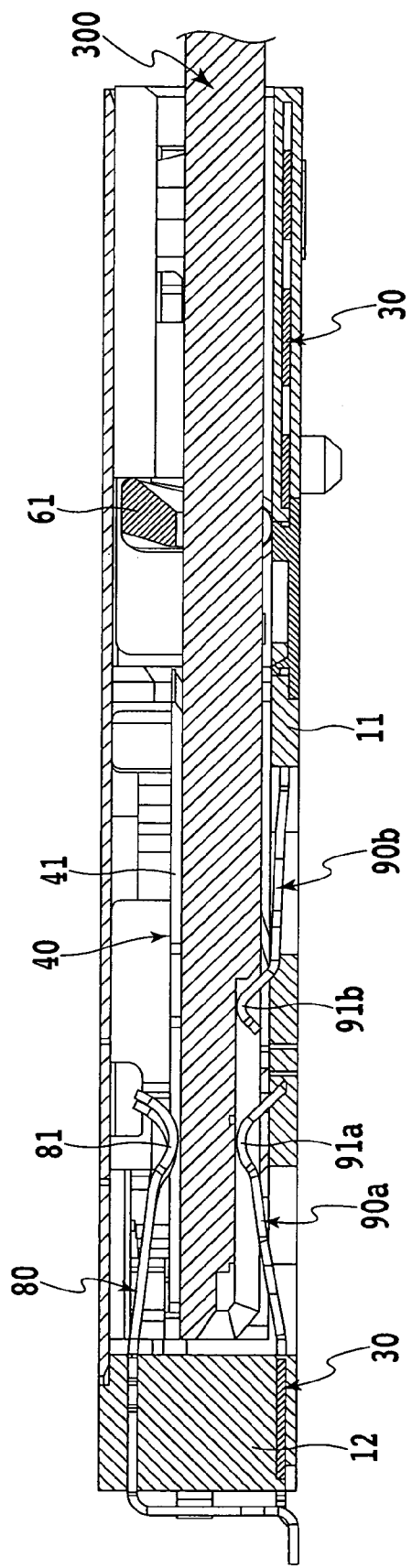
FIG. 12 is a sectional view similar to FIG. 11B, showing the card connector in which the tip of the IC card has come into abutting contact with the front wall.
Figure 13:
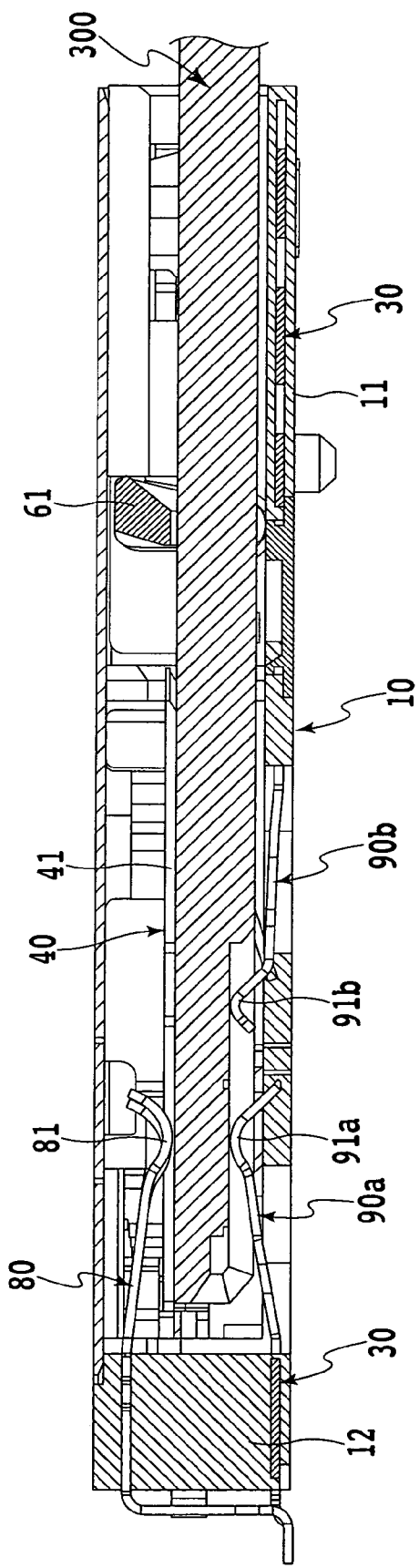
FIG. 13 is a sectional view similar to FIG. 11B, showing the card connector in which the IC card has been completely installed in the card connector.

FIGS. 12 and 13 show the state observed immediately before the small card 300 is installed in the card connector 1. This operation is similar to that performed on the large card 200 and will thus not be described below. Furthermore, as is the case with the large card 200, when the small card 300 is inserted in the card connector, the top surface (the surface with no pad formed thereon) of the small cad 300 may contact the plurality of first contacts 80 for the large card 200.

Even if the large card 300 is mistakenly inserted along the middle-stage guideways 16, the small width of the small card 300 precludes the paired contact portions 52 of the paired lock brackets 50 from being simultaneously moved to the second position. Thus, the actuator 60 is not enabled to rotate. Hence, the small card 300 is inhibited from being fed forward beyond the shutter member 61. This prevents the IC card 300, the card connector 1, and even an electronic apparatus connected to the IC card 300 via the card connector 1 from being damaged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A card connector in which a base member and a cover member form a card accommodation space with a card insertion slot and in which two types of cards, a large card and a small card having a width less than the large card, are capable of being selectively installed in the card accommodation space, the card insertion slot including paired first guideways along which the large card is guided and paired second guideways along which the small card is guided, the card connector comprising:

a plurality of contacts including a plurality of first contacts for the large card which comprise contact points arranged so as to face downward in the card accommodation space and a plurality of second contacts for the small card which comprise contact points arranged so as to face upward in the card accommodation space;

paired lock brackets configured to detect the width of the large card provided in the first guideways to move from a first position of the lock brackets to a second position of the lock brackets;

an actuator configured to engage with the paired lock brackets and to be rotatable from the first position of the actuator to the second position of the actuator, the actuator comprising at least an engagement portion and a passage opening through which the small card is capable of passing; and a partition member comprising a partition plate configured to be movable from the first position of the partition plate to the second position of the partition plate and a driving piece configured to engage with the engagement portion, the partition member sorting the inserted large and small cards to an upper part and a lower part, respectively, of the card accommodation space, wherein when the large card is inserted into the card connector with an external contact oriented upward, the lock bracket is moved from the first position of the lock bracket to the second position of the lock bracket to enable the actuator to be rotated, and when the large card is further fed into the card connector, the actuator is rotated from the first position of the actuator to the second position of the actuator to move the partition plate from the first position of the partition plate to the second position of the partition plate, thus allowing the large card to be guided to the upper part of the card accommodation space.

2. The card connector according to claim 1, wherein when the large card is further fed into the card connector, the partition plate of the partition member is capable of moving to a third position where the partition plate is parallel to a bottom wall of the base member.

3. The card connector according to claim 1, wherein the partition member further comprises a vertical guide piece and at least paired regulation pieces so as to allow the partition plate to be guided upward and downward and to allow elevation of partition plate to be regulated.

4. The card connector according to claim 1, wherein a pair of the engagement portions is formed on the actuator, and a pair of the driving pieces configured to engage with the respective paired engagement portions is formed on the partition plate.

5. The card connector according to claim 4, wherein the engagement portion comprises a recess portion formed therein and with which the driving piece is engaged.

6. The card connector according to claim 1, wherein the partition member comprises paired elongate spring receiving portions on respective opposite sides of the partition plate, and the partition plate is biased to the first position of the partition plate by paired pushup springs provided on the base member and corresponding to the respective paired elongate spring receiving portions.

7. The card connector according to claim 6, wherein the second contact and the paired pushup springs are formed as inserts embedded in the base member.

* * * * *